(12) United States Patent
Strange

(10) Patent No.: US 6,993,866 B1
(45) Date of Patent: Feb. 7, 2006

(54) FISHING BAIT RIG ATTACHMENT APPARATUS WITH ROTATING RATTLE

(76) Inventor: James Strange, 1618 Old Friendship Rd., Rock Hill, SC (US) 29730

( * ) Notice: Subject to any disclaimer, the term of this patent is extended or adjusted under 35 U.S.C. 154(b) by 0 days.

(21) Appl. No.: 10/877,194

(22) Filed: Jun. 25, 2004

Related U.S. Application Data

(60) Provisional application No. 60/482,367, filed on Jun. 25, 2003.

(51) Int. Cl.
*A01K 85/01* (2006.01)

(52) U.S. Cl. .................... 43/42.31; 43/42.36

(58) Field of Classification Search .............. 43/42.31, 43/42.22, 42.36, 42.39, 43.14, 44.9, 42.35, 43/42.15, 42.16, 42.19, 42.2, 42.21
See application file for complete search history.

(56) References Cited

U.S. PATENT DOCUMENTS

| | | | | |
|---|---|---|---|---|
| 779,744 A * | 1/1905 | Shakespeare, Jr. | ......... | 43/42.16 |
| 1,313,567 A * | 8/1919 | Ulrich | ........................ | 43/42.16 |
| 1,333,318 A * | 3/1920 | Kijima | ........................ | 43/42.2 |
| 1,610,204 A * | 12/1926 | Donholt | ..................... | 43/42.16 |
| 1,975,218 A * | 10/1934 | Worden | ..................... | 43/42.21 |
| 2,078,816 A * | 4/1937 | Shenitz | ..................... | 43/42.21 |
| 2,292,517 A * | 8/1942 | Greene | ....................... | 43/42.39 |
| 2,494,407 A * | 1/1950 | Rhodes | ...................... | 43/42.16 |
| 2,566,612 A * | 9/1951 | Hearne | ........................ | 43/44.9 |
| 2,591,558 A * | 4/1952 | Kramer | ....................... | 43/44.9 |
| 2,597,982 A * | 5/1952 | Fitzgerald | .................. | 43/42.35 |
| 2,606,387 A * | 8/1952 | Garner | ........................ | 43/42.2 |
| 2,693,049 A * | 11/1954 | Atton | ........................... | 43/44.9 |
| 2,741,864 A * | 4/1956 | Shotton | ....................... | 43/44.9 |
| 2,763,954 A * | 9/1956 | Bunker | ....................... | 43/42.31 |
| 2,769,268 A * | 11/1956 | Miller | ......................... | 43/42.39 |
| 2,792,661 A * | 5/1957 | Denby | ........................ | 43/42.16 |
| 2,835,999 A * | 5/1958 | Gillian | ....................... | 43/42.16 |
| 2,862,325 A * | 12/1958 | Magnus | ..................... | 43/42.22 |
| 2,926,452 A * | 3/1960 | Lewis | ......................... | 43/44.9 |
| 2,940,205 A * | 6/1960 | Cherry | ....................... | 43/42.16 |
| 2,977,707 A * | 4/1961 | Dreher | ....................... | 43/42.35 |
| 2,983,065 A * | 5/1961 | Ferguson et al. | .......... | 43/42.39 |
| 3,031,792 A * | 5/1962 | Swenson | ................... | 43/42.2 |
| 3,102,359 A * | 9/1963 | Cahill et al. | ............... | 43/43.14 |
| 3,151,413 A * | 10/1964 | Witz | ........................... | 43/42.22 |
| 3,530,612 A * | 9/1970 | Garrison | .................... | 43/42.16 |
| 3,670,447 A * | 6/1972 | Wohead | ..................... | 43/43.14 |
| 3,693,275 A * | 9/1972 | Craig | ......................... | 43/42.21 |
| 3,848,353 A * | 11/1974 | McClellan | ................. | 43/42.31 |
| 3,854,233 A * | 12/1974 | Browning, III | ............ | 43/42.31 |
| 3,885,340 A * | 5/1975 | Volenec | ..................... | 43/42.16 |
| 3,894,350 A * | 7/1975 | Parker | ........................ | 43/42.31 |
| 3,908,298 A * | 9/1975 | Strader | ....................... | 43/42.31 |

(Continued)

FOREIGN PATENT DOCUMENTS

GB    2340370 A1 *   2/2000

(Continued)

*Primary Examiner*—Darren W. Ark
(74) *Attorney, Agent, or Firm*—James M. Harrington, P.A.

(57) ABSTRACT

A rotating rattle attachment for a fishing bait rig includes a generally conical hollow body member, a lead line tube axially disposed within the body member, and one or more chambers defined by the body member and the lead line tube. Each chamber contains one or more balls, and the rattle has exterior fins to promote rotation as the rig is drawn through the water. The rattle produces an audible sound that will attract a target fish or will stress a bait fish into secreting hormones attractive to the target fish.

13 Claims, 2 Drawing Sheets

U.S. PATENT DOCUMENTS

| | | | | |
|---|---|---|---|---|
| 3,909,973 | A * | 10/1975 | Fairbanks | 43/42.31 |
| 4,008,539 | A * | 2/1977 | Gardner | 43/42.31 |
| 4,037,346 | A * | 7/1977 | Holst | 43/42.2 |
| 4,139,964 | A * | 2/1979 | Pelletier | 43/42.19 |
| 4,268,988 | A * | 5/1981 | Johnson, Jr. II | 43/44.9 |
| 4,483,091 | A * | 11/1984 | Norlin | 43/42.31 |
| 4,501,086 | A * | 2/1985 | Bunce | 43/42.2 |
| 4,619,068 | A * | 10/1986 | Wotawa | 43/42.31 |
| 4,744,169 | A * | 5/1988 | Nochta | 43/42.31 |
| 4,745,700 | A * | 5/1988 | Davis | 43/42.31 |
| 4,785,569 | A * | 11/1988 | Thomas, Jr. | 43/42.31 |
| 4,817,326 | A * | 4/1989 | Benjestorf | 43/44.9 |
| 4,969,287 | A * | 11/1990 | Johnson | 43/42.31 |
| 5,024,019 | A * | 6/1991 | Rust et al. | 43/42.31 |
| 5,121,568 | A * | 6/1992 | Lindmeyer | 43/42.31 |
| 5,144,765 | A * | 9/1992 | Keeton | 43/42.31 |
| 5,230,178 | A * | 7/1993 | Dillard | 43/42.31 |
| 5,259,151 | A * | 11/1993 | Wicht | 43/42.31 |
| 5,381,622 | A * | 1/1995 | Tregre | 43/42.31 |
| 5,428,919 | A * | 7/1995 | Enomoto | 43/42.31 |
| 5,497,581 | A * | 3/1996 | Williams | 43/42.31 |
| 5,588,247 | A * | 12/1996 | Wicht | 43/42.31 |
| 5,822,912 | A * | 10/1998 | Kato et al. | 43/42.31 |
| 5,829,183 | A * | 11/1998 | Guerin | 43/42.31 |
| 6,155,000 | A * | 12/2000 | Ravencroft | 43/42.31 |
| 6,176,035 | B1 * | 1/2001 | Somogyi | 43/42.31 |
| 6,523,297 | B1 * | 2/2003 | Hair et al. | 43/42.2 |
| 6,836,997 | B2 * | 1/2005 | Cramsey | 43/43.14 |

FOREIGN PATENT DOCUMENTS

| | | | |
|---|---|---|---|
| JP | 10-191837 | B1 * | 7/1998 |
| JP | 10-191839 | B1 * | 7/1998 |
| JP | 10-295222 | B1 * | 11/1998 |
| JP | 2001-78 | B1 * | 1/2001 |
| JP | 2001-45920 | B1 * | 2/2001 |
| JP | 2002-131 | B1 * | 1/2002 |
| WO | WO-01/95712 | A1 * | 12/2001 |

* cited by examiner

FISHING BAIT RIG ATTACHMENT APPARATUS WITH ROTATING RATTLE

CROSS REFERENCE TO RELATED APPLICATIONS

This application claims the benefit of U.S. Provisional Patent Application Ser. No. 60/482,367, filed Jun. 25, 2003, the entirety of which is incorporated herein by reference.

FIELD OF THE INVENTION

The present invention relates to an attachment apparatus for a fishing bait rig, and more particularly to a fishing bait rig attachment apparatus having a rotating rattle, which is useful in improving the success rate in sport fishing and particularly useful in live-bait operations.

BACKGROUND OF THE INVENTION

For thousands of years, humans have sought to improve their success at fishing, both as a means for providing nourishment and as an entertaining activity. In recent years, the sport of competitive fishing has grown in popularity, and the art and science of catching fish has developed correspondingly, as professional sport fishermen seek a competitive advantage.

One of the age-old methods of fishing exploits the fact that many sport fish are predatory on smaller fish, and so a smaller, live bait fish is placed on a hook and cast into the water. A target fish is prospectively attracted to the bait fish, whether by sight (of motion of the bait fish) or smell, particularly of blood or of stress-induced hormones. When the target fish eats the bait fish, the target fish is hooked and, if everything goes as is intended, landed.

There are a number of variations on this arrangement well known to those skilled in the art of sport fishing. Heretofore, however, these variations have not made use of the full range of predatory behavior of sport fish.

As a survival instinct, a predator fish ideally consumes as little energy as possible in hunting for food. When confronted with a school of prey fish, the predator fish will often seek out the member of the school that is the most likely to be caught easily. That fish will be the one that is the most highly distressed, whether by an injury or some other factor known only to the fish itself. When the prey fish is under stress, it secretes pheromones or hormones that are intended to help the prey fish compensate for the stress. The predator fish, having a highly developed sensory perception of these chemicals, can identify the distressed fish and strike at it more easily than at a healthy fish not under stress.

What is needed, then, is a fishing lure apparatus, suitable for use with live bait, that works to induce the secretion of stress-induced chemicals.

SUMMARY OF THE INVENTION

In accordance with the foregoing, then, the present invention includes an apparatus suitable for attachment to a bait rig, such as a live bait rig, in which a rotating rattle acts to produce sound for distressing the bait fish. The bait fish is thus induced to secrete stress-induced chemicals, which serve as a marker to the target fish and increase the likelihood that a target fish will strike the bait fish and be caught.

More specifically, the present invention is a bait rig apparatus suitable for attachment to a bait rig, which is formed, from plastic in a preferred embodiment, as a generally conical, chambered device. The device includes a centrally located, axially disposed tube for threading a lead line therethrough, to which lead line a bait rig may be attached, such that the device is free to rotate about the lead line. The interior of the cone is hollow and formed with a set of closed chamber, and the exterior thereof is provided with a set of fins. The fins are generally aligned with each chamber wall and are disposed at an angular offset from the axis of the cone.

Each of the chambers is provided with one or more solid hard spheres, which strike at the walls of the chamber as the device is moved, producing the sound of a rattle.

As the bait rig and, correspondingly, the present invention are drawn through water, the angular offset of the fins causes a spinning motion to be imparted to the device, which causes the device to rotate about the lead line. The spinning motion, together with gravity, causes the spheres to rattle about their respective chambers, producing an audible noise. The proximity of the rattle to the bait fish and its orientation at the face of the bait fish causes stress to the bait fish, which in turn induces the bait fish to secrete hormones and/or pheromones. These chemicals work to attract the target fish and to induce the target fish to strike at the bait fish.

The present invention is further suitable in non-live-bait operations, as it serves to generate noise which can attract the target fish to the bait even in the absence of the stress-induced chemicals.

BRIEF DESCRIPTION OF THE DRAWINGS

Further features, embodiments, and advantages of the present invention will become apparent from the following detailed description with reference to the drawings, wherein.

DETAILED DESCRIPTION OF THE PREFERRED EMBODIMENTS

Figures 1, 2:
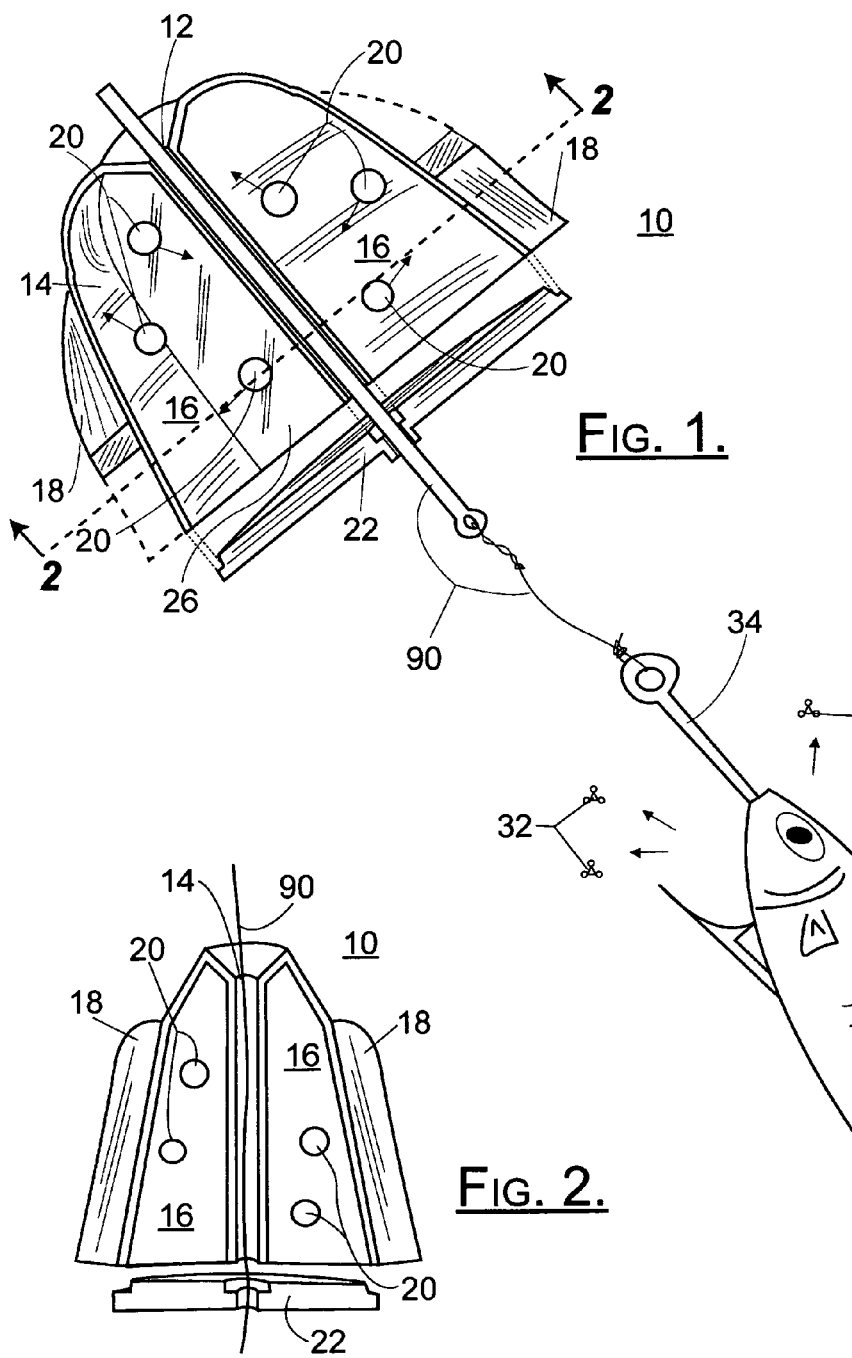
FIG. 1 is a lateral cross-sectional view of a device according to the present invention, with the parts thereof in exploded relation.
FIG. 2 is a lateral cross-sectional view as in FIG. 1 of an alternative embodiment of a device according to the present invention.

Referring now to FIG. 1, a device according to the present invention is show in a lateral view with the parts thereof in exploded relation. A generally conical bait rig attachment 10 is provided with an axially oriented central tube 12, through which a lead line 90 may be run. The exterior wall 14 of the attachment 10 surrounds at least one chamber 16, and in a preferred embodiment at least three chambers 16, which are separated by radially extending rib walls 26. The bait rig attachment 10 is free to rotate on its axis about the lead line 90.

The exterior wall 14 is provided with a plurality of fins 18, which extend radially outward from the exterior wall 14 and are, in a preferred embodiment, oriented at an angular displacement from the axis of the central tube 12. As the attachment 10 is drawn through the water, this angular displacement causes a portion of the axially directed force of the water to be deflected along the circumference of the attachment 10, which imparts a spinning motion to the attachment 10.

Each chamber 16 is provided with a hard sphere, such as a ball 20, on the interior thereof, and an end cap 22, which is designed to cooperate with the bottom portion of the attachment 10, is attachable thereto to seal off the chambers 16. Ideally, the end cap 22 is permanently attached to the attachment 10, such as by glue or welding, to prevent the balls 20 from escaping the chambers 16, but an interference-type fit may be used without departing from the scope of the invention.

As the attachment 10 turns through the water, the balls 20 rattle about the chambers 16, which produces an audible noise or rattle. The rattle serves to stress the bait fish 30 on hook 34, which induces the bait fish 30 to secrete hormones or pheromones 32 (shown in exaggerated size) that may be sensed by the target fish (not shown).

Referring now to FIG. 2, an alternative embodiment of the present invention is shown in a view similar to that in FIG. 1, and like numbers represent like elements in the figures. The device 10 shown in FIG. 2 retains a generally conical shape, but the device 10 has a generally longer shape, and the fins 18 have a different profile. Although the operational characteristics of the device in FIG. 2 are the same as in FIG. 1, the resulting rattle may have a different characteristic frequency, and the speed at which the attachment turns may vary. Indeed, it is possible to vary the volume level and frequency of the rattle, and to vary the speed at which the rattle turns as it is drawn through the water, simply by varying the particular configuration of the fins and the chambers, and without departing from the scope of the invention.

The present invention is preferably made of molded plastic, but other suitable materials may be used with similar results, depending upon the preferred action of the attachment.

Figure 3:
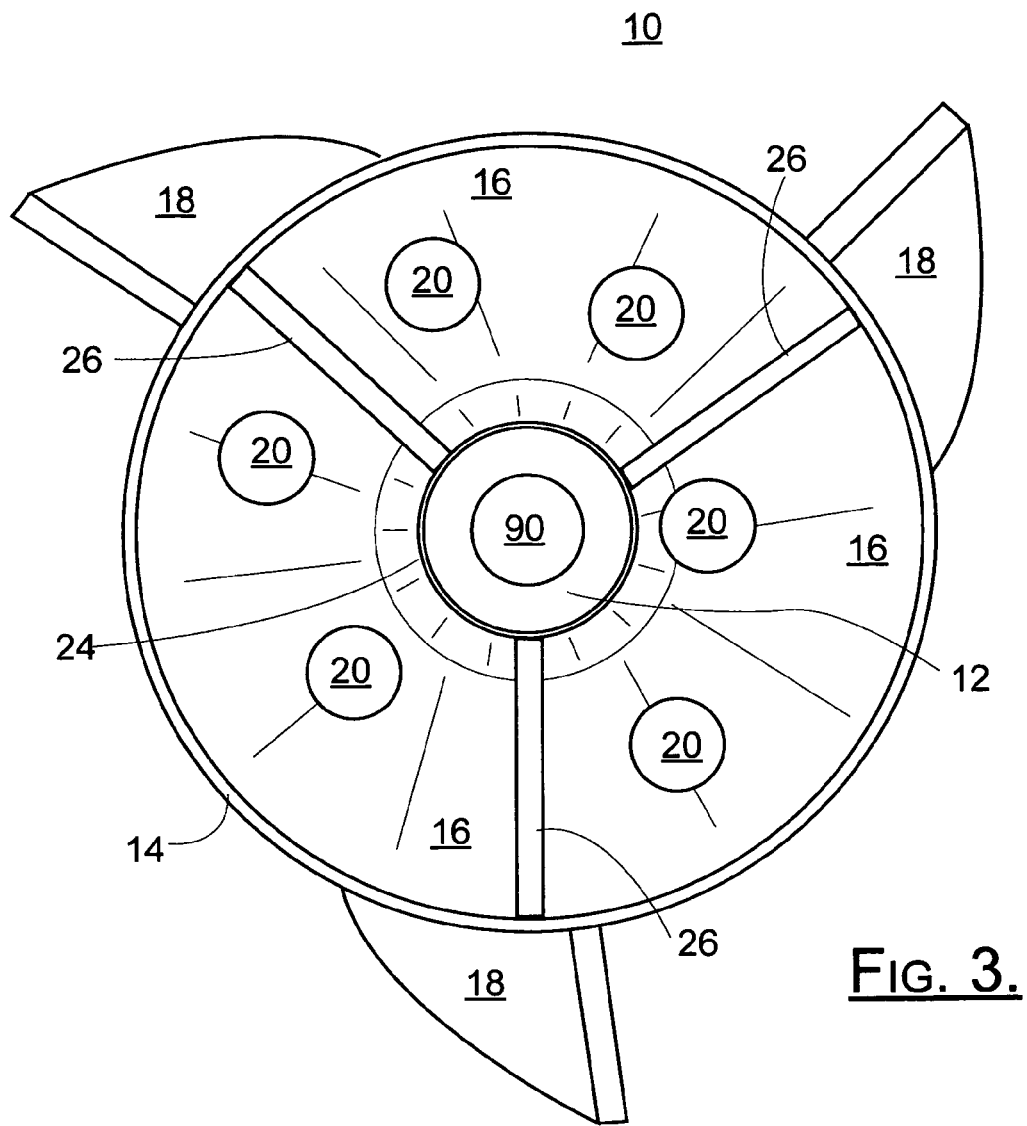
FIG. 3 is a bottom-oriented cross-sectional view of a device according to the present invention.

Turning now to FIG. 3, a device as in FIG. 1 is shown in a bottom-oriented cross-section. The central tube 12 is provided to allow a lead line 90 (see FIG. 1) to be threaded therethrough and forms an inner wall 24 for the device. The exterior wall 14 is provided with, in a preferred embodiment, three exterior fins 18, which are oriented as described above. The exterior wall 14 surrounds, in a preferred embodiment, three chambers 16 which are defined by the inner and exterior walls 24, 14 and by radially extending ribs 26. The ribs 26 are generally aligned, for purposes of strength and ease of molding, with the exterior fins 18.

In view of the aforesaid written description of the present invention, it will be readily understood by those persons skilled in the art that the present invention is susceptible of broad utility and application. Many embodiments and adaptations of the present invention other than those herein described, as well as many variations, modifications, and equivalent arrangements, will be apparent from or reasonably suggested by the present invention and the foregoing description thereof, without departing from the substance or scope of the present invention. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof.

What is claimed is:

1. An attachment for a fishing bait rig, in which a live bait fish is used to attract a target fish, the attachment comprising:
   a generally conical hollow body member having an exterior wall;
   a lead line tube axially disposed in the body member;
   a plurality of sealed chambers defined by the body member, the lead line tube, and a plurality of ribs, each rib extending in a plane parallel to the lead line tube between the lead line tube and the exterior wall of the body member;
   at least one ball disposed in at least one of the chambers; and
   at least one fin disposed exteriorly to the body member and angularly offset from an axis of the body member;
   whereby a spinning motion of the body member causes the at least one ball to rattle and thereby produces an audible noise for stressing the live bait fish to induce secretion of target fish-attracting chemicals.

2. An attachment according to claim 1, comprising a plurality of balls, each disposed in one of the plurality of chambers.

3. An attachment according to claim 1, comprising a plurality of fins, wherein each fin is aligned with one of the ribs.

4. An attachment according to claim 1, comprising three chambers defined by the body member, the lead line tube, and three ribs connected therebetween.

5. An attachment according to claim 4, comprising a plurality of balls, each disposed in one of the plurality of chambers.

6. An attachment according to claim 1, wherein the body member is molded from plastic.

7. A fishing bait rig, comprising:
   a lead line;
   a hook for hooking a target fish; and
   a rattle attached to the lead line, the rattle comprising a generally conical hollow body member having an exterior wall, a lead line tube axially disposed in the body member, a plurality of sealed chambers defined by at least the body chamber, the lead line tube, and a plurality of ribs, each rib extending in a plane parallel to the lead line tube between the lead line tube and the exterior wall of the body member, at least one ball disposed in at least one of the chambers, and at least one fin disposed exteriorly to the body member and angularly offset from an axis of the body member;
   wherein the rattle is configured to spin to produce an audible noise to attract the target fish.

8. A fishing bait rig, comprising:
   a lead line;
   a live bait fish;
   a hook for holding the live bait fish; and
   a rattle attached to the lead line, the rattle comprising a generally conical hollow body member having an exterior wall, a lead line tube axially disposed in the body member, a plurality of sealed chambers defined by at least the body member, the lead line tube, and a plurality of ribs, each rib extending in a plane parallel to the lead line tube between the lead line tube and the exterior wall of the body member, at least one ball disposed in at least one of the chambers, and at least one fin disposed exteriorly to the body member and angularly offset from an axis of the body member;
wherein the rattle is configured to spin to produce an audible noise for stressing the live bait fish to induce secretion of target fish-attracting chemicals.

9. A bait rig according to claim 8, comprising a plurality of balls, each disposed in one of the plurality of chambers.

10. A bait rig according to claim 8, comprising a plurality of fins, wherein each fin is aligned with one of the ribs.

11. A bait rig according to claim 8, comprising three chambers defined by the body member, the lead line tube, and three ribs connected therebetween.

12. A bait rig according to claim 11, comprising a plurality of balls, each disposed in one of the plurality of chambers.

13. A bait rig according to claim 8, wherein the body member is molded from plastic.

* * * * *